US010286939B2

(12) United States Patent
Bacallao et al.

(10) Patent No.: US 10,286,939 B2
(45) Date of Patent: May 14, 2019

(54) SHOPPING CART WITH SCANNER SYSTEM (71) Applicant: Walmart Apollo, LLC, Bentonville, AR (US)

(72) Inventors: Yurgis Mauro Bacallao, Centerton, AR (US); Natalie L. Scott, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/969,899

(22) Filed: May 3, 2018

(65) Prior Publication Data
US 2018/0334182 A1 Nov. 22, 2018

Related U.S. Application Data (60) Provisional application No. 62/508,135, filed on May 18, 2017.

(51) Int. Cl.
*B62B 3/14* (2006.01)
*B62B 5/00* (2006.01)

(52) U.S. Cl.
CPC .................. *B62B 5/0096* (2013.01)

(58) Field of Classification Search
CPC ...... B62B 5/0096; B62B 2203/50; B62B 3/14
See application file for complete search history.

(56) References Cited

U.S. PATENT DOCUMENTS

| | | | | |
|---|---|---|---|---|
| 3,836,755 | A | * 9/1974 | Ehrat | G06Q 20/343 177/25.15 |
| 4,071,740 | A | * 1/1978 | Gogulski | G06K 7/10861 186/61 |
| 4,156,318 | A | 5/1979 | Economy | |
| 5,424,524 | A | 6/1995 | Ruppert et al. | |
| 5,495,097 | A | 2/1996 | Katz et al. | |
| 5,898,158 | A | * 4/1999 | Shimizu | G01G 19/4144 186/61 |
| 6,168,079 | B1 | 1/2001 | Becker et al. | |

(Continued)

FOREIGN PATENT DOCUMENTS

CN 203126906 U 8/2013
WO 2010144054 A1 12/2010

OTHER PUBLICATIONS

Gutsche, Jeremy "Self-Serve Checkouts are Taken a Step Further," TrendHunter.com, Jan. 21, 2007.

(Continued)

*Primary Examiner* — Bryan A Evans
(74) *Attorney, Agent, or Firm* — Schmeiser, Olsen & Watts LLP (57) ABSTRACT Disclosed is a shopping cart with a scanner system that is used by customers of a retail store to collect and scan items to be purchased. The shopping cart with scanner system includes a shopping cart, a scanner support structure, and a scanner. Items to be purchased are placed in the shopping cart, where they are automatically scanned by the scanner system. The scanner support structure includes a base bar, an extension bar, and a scanner support bar. The base bar and extension bar are coupled to each other and to a shopping basket of the shopping cart. The scanner support bar holds the scanner and related electronic devices, and is supported above the shopping cart basket by the base bar and the extension bar.

20 Claims, 9 Drawing Sheets

(56) References Cited

U.S. PATENT DOCUMENTS

| | | | |
|---|---|---|---|
| 6,484,939 B1 | | 11/2002 | Blaeuer |
| 6,910,697 B2 | * | 6/2005 | Varatharajah ............. B62B 3/14 |
| | | | 235/383 |
| 7,895,777 B2 | | 3/2011 | Crum |
| 7,934,647 B1 | * | 5/2011 | Mims ................... B62B 5/0096 |
| | | | 235/383 |
| 7,953,606 B2 | * | 5/2011 | Shirasaki ............. G06Q 20/204 |
| | | | 280/33.991 |
| 8,215,650 B2 | | 7/2012 | Arceta et al. |
| 8,464,945 B2 | * | 6/2013 | Connelly ................ B62B 3/148 |
| | | | 235/375 |
| 8,564,401 B2 | | 10/2013 | Padgett et al. |
| 9,230,249 B1 | | 1/2016 | Vora |
| 2004/0249717 A1 | * | 12/2004 | Shirasaki ............. G06Q 20/204 |
| | | | 705/17 |
| 2008/0308630 A1 | * | 12/2008 | Bhogal .................. G06Q 30/02 |
| | | | 235/383 |
| 2009/0106085 A1 | * | 4/2009 | Raimbeault .......... G06Q 20/208 |
| | | | 705/14.44 |
| 2018/0370554 A1 | * | 12/2018 | Raza ..................... B62B 5/0096 |

OTHER PUBLICATIONS

Gunther, Melanie "The little something extra for shopping carts," iXtenso.com, Jan. 8, 2016.
Non-Final Office Action in U.S. Appl. No. 15/969,891 dated Jan. 8, 2019; 8 pages.

\* cited by examiner

SHOPPING CART WITH SCANNER SYSTEM

CROSS REFERENCE TO RELATED APPLICATION

This invention claims priority to U.S. provisional patent application Ser. No. 62/508,135, filed May 18, 2017 entitled "Shopping Cart with Scanner System", which is incorporated entirely herein by reference.

BACKGROUND OF THE INVENTION

Technical Field

This invention relates to scanners for obtaining product information from retail products being sold, and specifically to a scanner system that attaches a scanner to a shopping cart so that the scanner can scan the products in the shopping cart.

State of the Art

Electronic scanners are used at checkout stations in retail stores to electronically collect the price and product information of products that are being purchased by a customer. The scanner can be a bar code scanner that reads a bar code on the product, or a camera that captures a digital image of the product or a bar code, or a different type of electronic data capture device. The scanning can be accomplished using many different types of electronic data capture. The product price is used to tabulate a total amount owed by a specific customer. The product information is used by the retail store to keep track of what products are being purchased. Retails stores are moving away from having fixed checkout stations that customers visit to pay for their purchases. Trends in product purchase are moving towards customers scanning their own purchases and paying for them electronically, without visiting a checkout station in the retail store. Some stores distribute scanners to their customers to scan each product as it is put in the shopping cart or let the customers use their own mobile computing device to scan the products as they are put in the cart. This method requires the customer to physically scan each item, however, which can result in errors. It is desirable to have a scanner that mounts to a shopping cart and automatically scans items in the shopping cart. Ideally, the scanner would be mounted to the shopping cart such that the scanning would be done without customer input needed.

Accordingly, what is needed is a shopping cart scanner system including a scanner support structure that mechanically holds both the scanner and the other items related to the scanner, so that the scanner can automatically scan and collect product information from items in a shopping cart.

DETAILED DESCRIPTION OF EMBODIMENTS OF THE INVENTION

As discussed above, embodiments of the present invention relate to scanners for obtaining product information from retail products being sold, and specifically to a scanner system that attaches a scanner to a shopping cart so that the scanner can scan the products in the shopping cart.

A checkout station is a location in a retail store where customers bring their items they wish to purchase. The items to be purchased are "rung up" and bagged at the checkout station. Electronic scanners are routinely used at checkout stations to collect the price and product information from products to be purchased. The price is used to add up the total amount of payment due from the customer. Product information is collected and used by the store to track inventory, for example, as well as to collect and analyze other information about what products are sold and who is buying them. Checkout stations are equipped with electronic scanners to collect this product information quickly and easily. Laser scanners are common at checkout stations to scan a bar code on the product, but an electronic scanner can use many different types of technology to scan a product. Electronic scanners can use lasers or image sensors to capture barcode or QR code information, for example. Alternatively, electronic scanners can obtain product information using electronic communication with a tag or device on the product, which can include any type of electronic communication between the scanner and the product, where the communication is wired or wireless.

The trend in retail stores is for customers to handle their own checkout tasks without help from retail store employees. Self-checkout stations have electronic scanners that customers can use to scan their products and checkout by themselves. However, this still requires the customer to go to a self-checkout station and use the scanner located at the self-checkout station. To make checkout even easier, some stores are having customers scan their items as they collect them in their shopping cart. The customer can either borrow a hand-held scanner from the retail store, or use their own smart phone or other mobile computing device to scan each device as it is placed in the shopping cart. The next step in making self-checkout easy is to implement a scanner mounted to the shopping cart which automatically scans products as they are put in the shopping cart. This relieves the customer of having to individually scan each product.

Disclosed herein is a shopping cart with a scanner system. The shopping cart with scanner system is used by customers of a retail store to collect and scan items to be purchased. Items to be purchased are placed in the shopping cart, where they are automatically scanned by the scanner system. The customer does not need to individually scan by hand each item in the cart. Once the customer is completed gathering items to be purchased, they can electronically pay for the items and leave the retail store. The shopping cart with scanner system includes a shopping cart and a scanner system. The scanner system includes a scanner support structure mounted to the shopping cart, and a scanner coupled to the scanner support structure.

Also disclosed is a shopping cart scanner support structure that couples a scanner to a shopping cart and supports the scanner above the shopping cart basket. The scanner support structure includes a base bar, an extension bar, and a scanner support bar. The base bar and extension bar are coupled to each other and to a shopping basket of the shopping cart. The scanner support bar holds a scanner and related electronic devices, and is supported above the shopping cart basket by the base bar and the extension bar. The scanner support structure holds the scanner above the shopping cart basket so that the scanner is in a position to scan products that are placed in the shopping basket. The scanner support structure securely holds the scanner and related items, such as a light and a computer processor, above the shopping basket.

Figure 1:
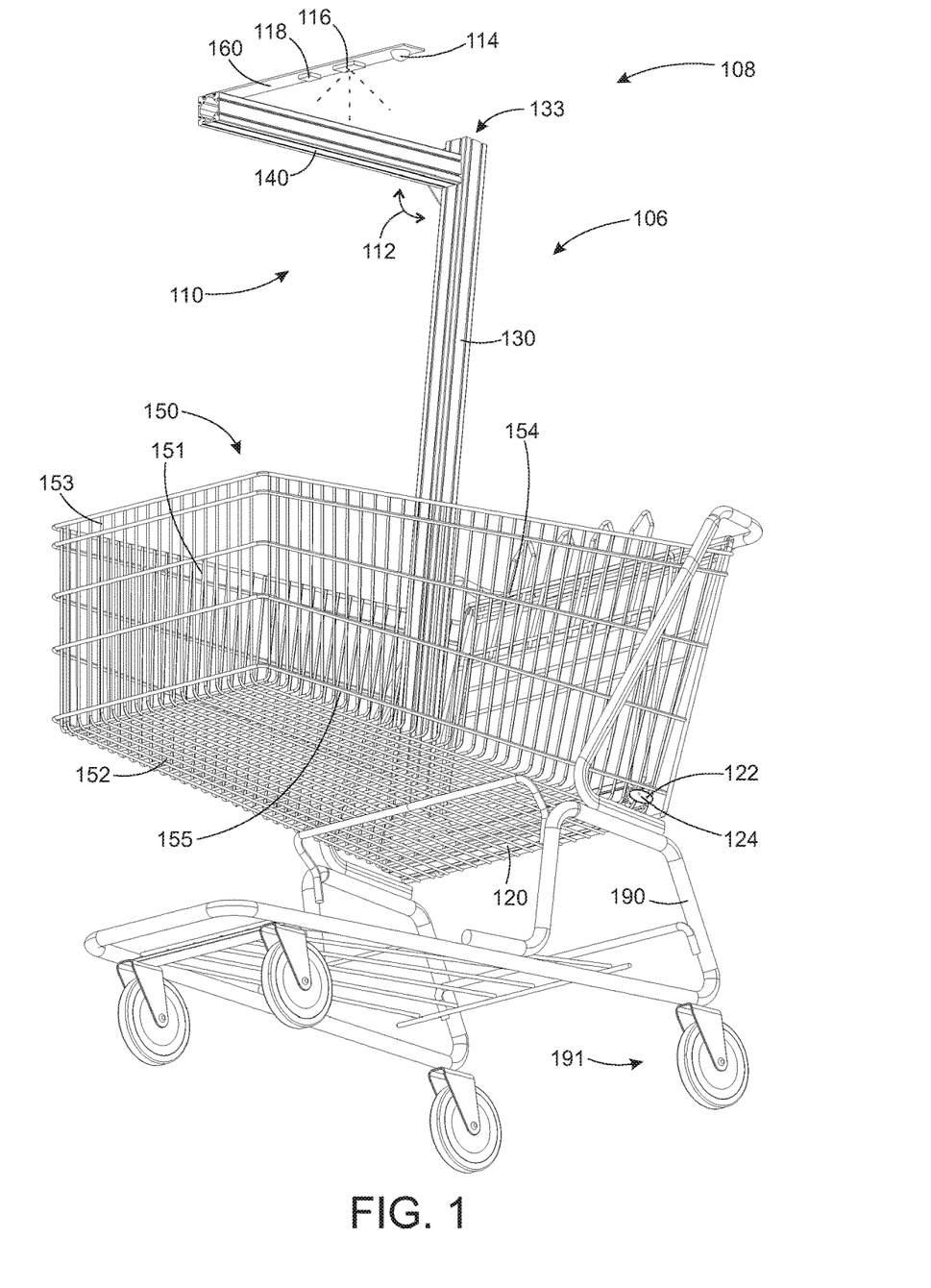
FIG. 1 shows a bottom perspective view of a shopping cart with scanner system.
Figure 2:
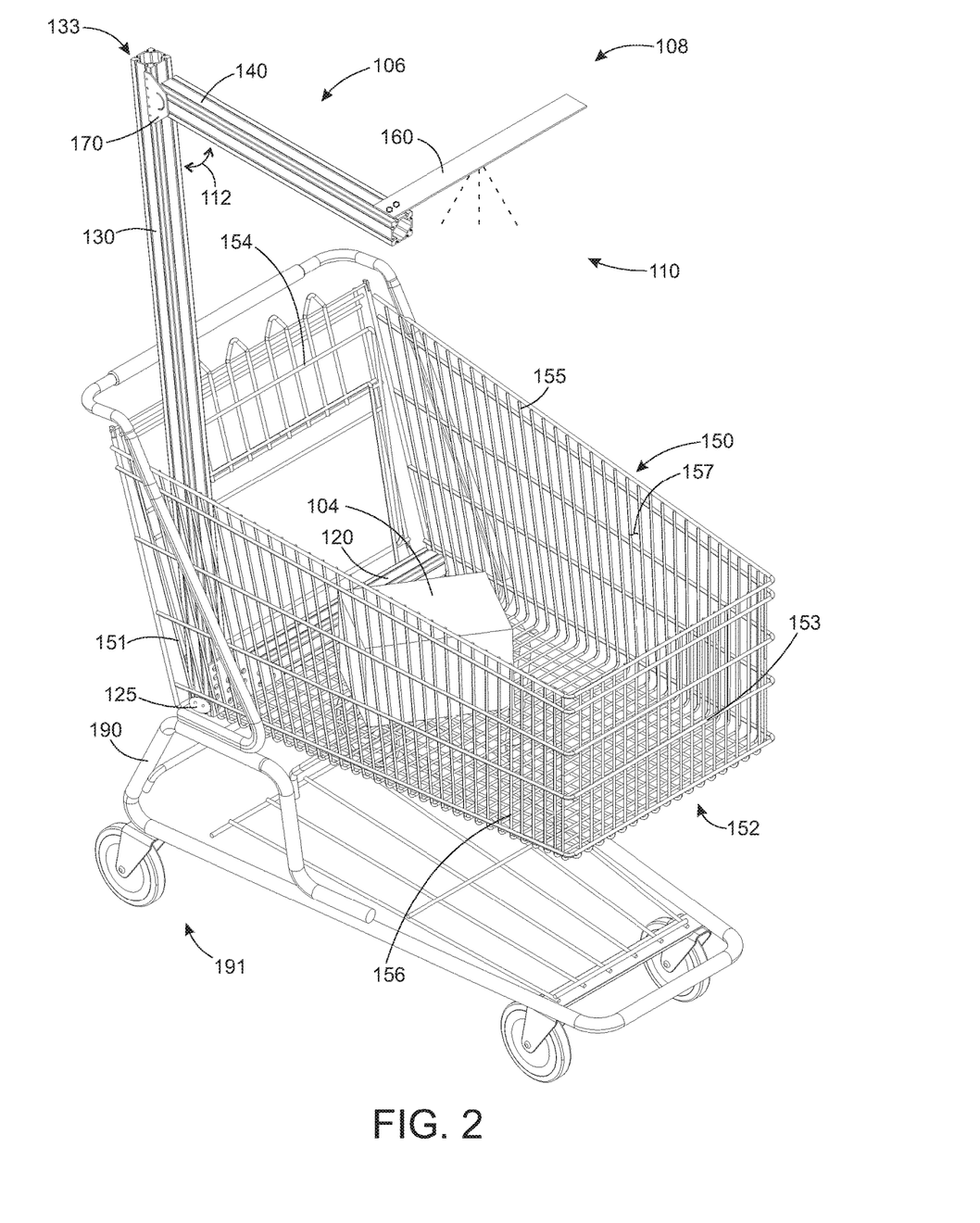
FIG. 2 shows a top perspective view of the shopping cart with scanner system of FIG. 1.

FIG. 1 and FIG. 2 shows upper and lower perspective views of a shopping cart with scanner system 108. Shopping cart with scanner system 108 includes a shopping cart 150, and a shopping cart scanner system 106. Shopping cart scanner system 106 includes a shopping cart scanner support structure 110, and a scanner 114. Scanner 114 is an electronic scanner that obtains product information from items in shopping cart 150, such as, for example, item to be purchased 104 as shown in (FIG. 2). Scanner 114 can be an optical bar code scanner, a laser scanner, an image capture device, an electronic card reader, or any other type of electronic device known now or in the future that obtains product information from the items to be purchased in shopping cart 150. Scanner 114 is coupled to a scanner arm 160 in this embodiment. Shopping cart scanner system 106 can also include a light 116 and a microcomputer 118, as shown in FIG. 1. Light 116 and microcomputer 118 are coupled to scanner arm 160 in this embodiment. Light 116 is used to illuminate item to be purchased 104 in shopping cart 150 so that scanner 114 can obtain product information from item to be purchased 104 and any other items to be purchased in shopping cart 150. In some embodiments, light 116 is a laser light emitter, but this is not meant to be limiting. In some embodiments, light 116 is a white light emitter. Light 116 can be any type of light and can emit light of any wavelength or wavelength range. Microcomputer 116 controls scanner 114 and light 116, and collects and processes the product information scanned from the items to be purchased, such as item to be purchased 104. Scanner arm 160 is a part of scanner support structure 110. Scanner support structure 110 is coupled to shopping cart 150, and holds scanner 114 and light 116 above shopping cart 150 so that scanner 114 can collect product information from item 104 placed in shopping cart 150 by a customer.

Shopping cart 150 can be any type of shopping cart. In this embodiment, shopping cart 150 is a type of shopping cart commonly found in grocery stores. Shopping cart 150 includes a shopping basket 151 that holds items to be purchased such as item 104. Shopping basket 151 is supported by a basket support frame 190 that has a set of wheels 191. Shopping cart 150 rolls on set of wheels 191 so that shopping cart 150 can be filled with items as a customer pushes shopping cart 150 around while shopping. Shopping basket 151 in this embodiment includes a bottom panel 152 and four side panels that includes a front panel 153, a rear panel 154, a first side panel 155, and a second side panel 156, as shown in FIG. 1 and FIG. 2. Shopping basket 151 has an open top 157. Shopping basket 151 in this embodiment is formed of a lattice of rails, but this is not meant to be limiting.

Figure 3:
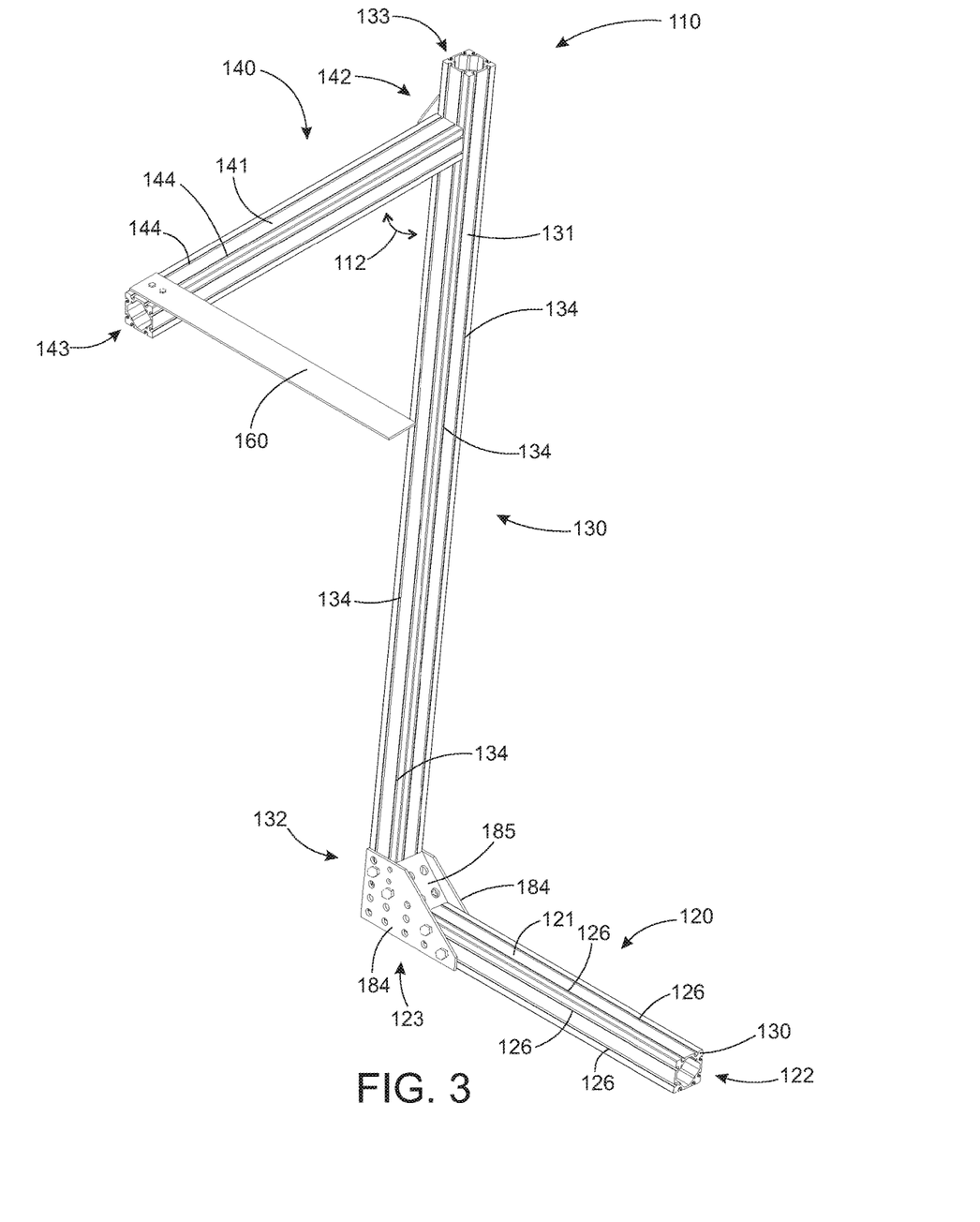
FIG. 3 shows a perspective view of a scanner support structure of the shopping cart with scanner system of FIG. 1.
Figure 4:
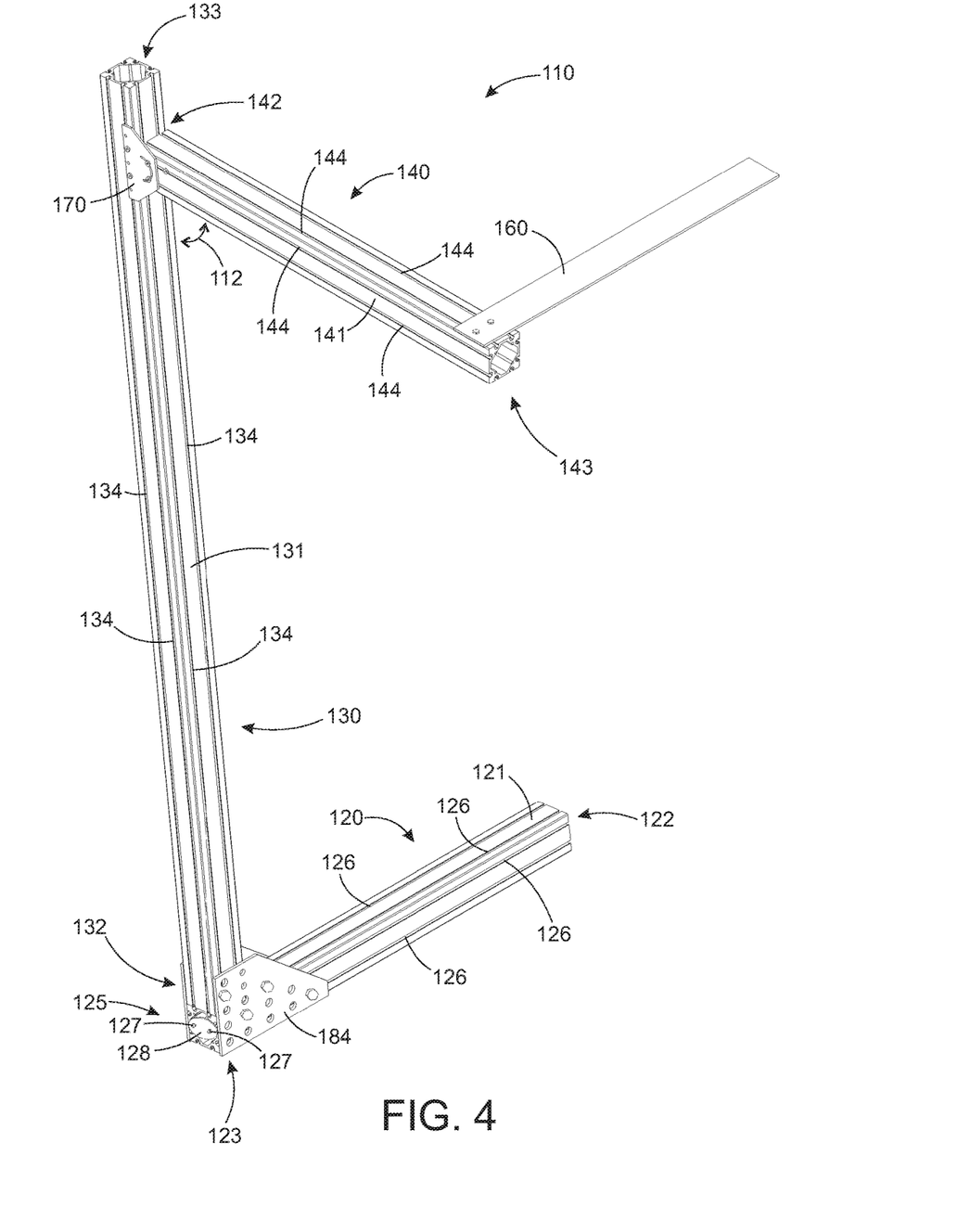
FIG. 4 shows another perspective view of the scanner support structure of FIG. 3.

FIG. 3 and FIG. 4 show two different perspective views of scanner support structure 110. Scanner support structure 110 includes a base bar 120, an extension bar 130, a scanner support bar 140, and scanner arm 160, as shown in FIG. 3 and FIG. 4. Scanner support structure 110 is coupled to shopping basket 151 of shopping cart 150. Scanner 114 and associated electronics are coupled to scanner support structure 110 to form scanner system 106 (FIG. 1 and FIG. 2). Scanner 114 scans items to be purchased that are put in shopping basket 151 while a customer using shopping cart with scanner system 108 is shopping.

Figure 5:
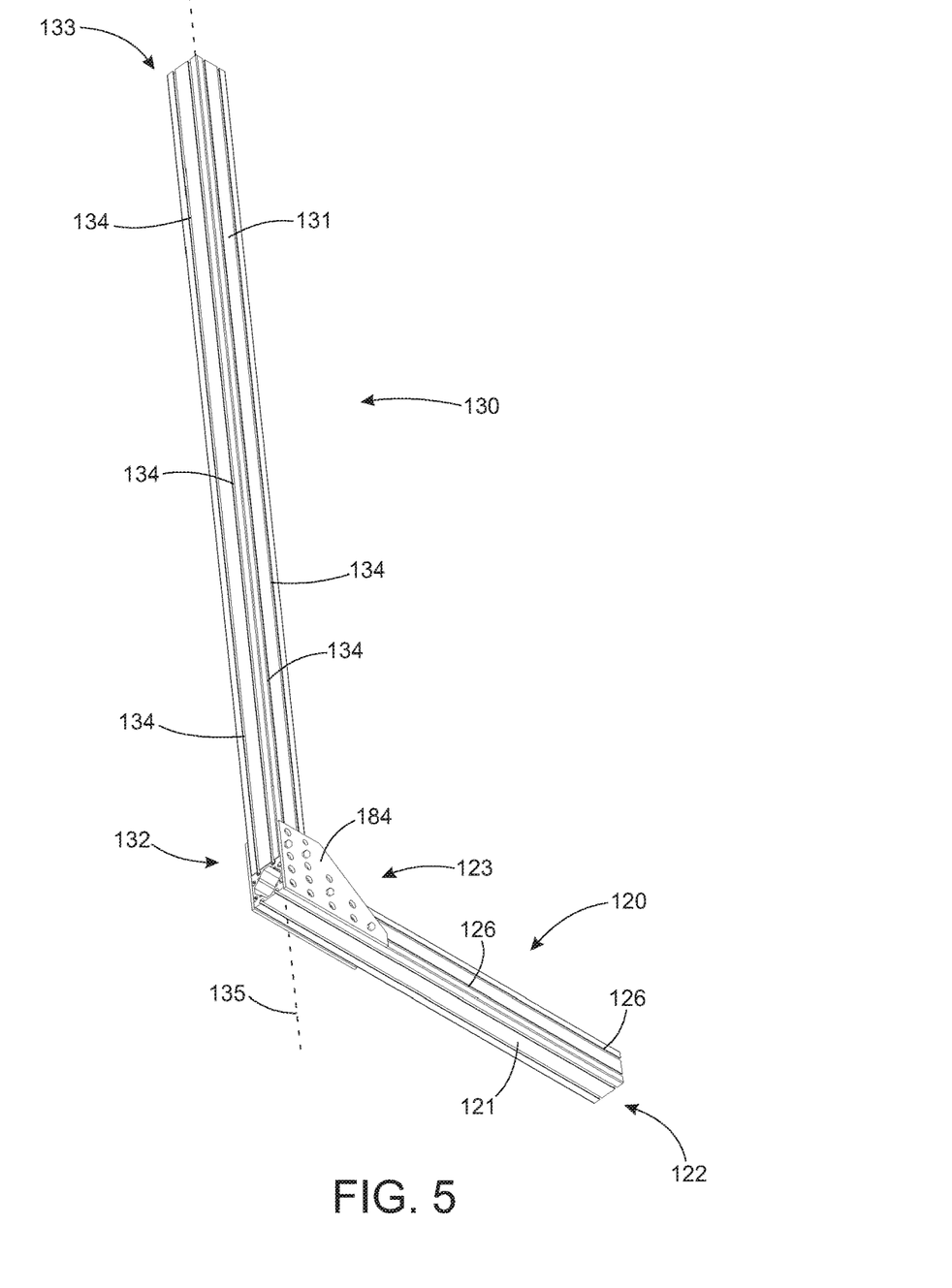
FIG. 5 shows a bottom perspective view of a base bar and extension bar of the scanner support structure of FIG. 3.

Base bar 120 and extension bar 130 are coupled to each other and to shopping basket 151 of shopping cart 150. Base bar 120 and extension bar 130 are best seen in FIG. 3 through FIG. 5. FIG. 5 shows a perspective view of base bar 120 coupled to extension bar 130. Base bar 120 is an elongate rigid bar 121 with a base bar first end 122 and a base bar second end 123 opposing base bar first end 121, as shown in FIG. 3 through FIG. 5. Elongate rigid bar 121 is a straight extruded aluminum bar with base bar T slots 126 on each side, in this embodiment, but this is not meant to be limiting. Elongate rigid bar 121 in this embodiment is an extruded T slot aluminum bar with a square cross section and two base bar T slots 126 on each of the four sides of elongate rigid bar 121, as shown in FIG. 3 through FIG. 5. A T slot is a T-shaped groove in a bar that is used to capture couplers to make it easy to couple bars together.

Figure 6:
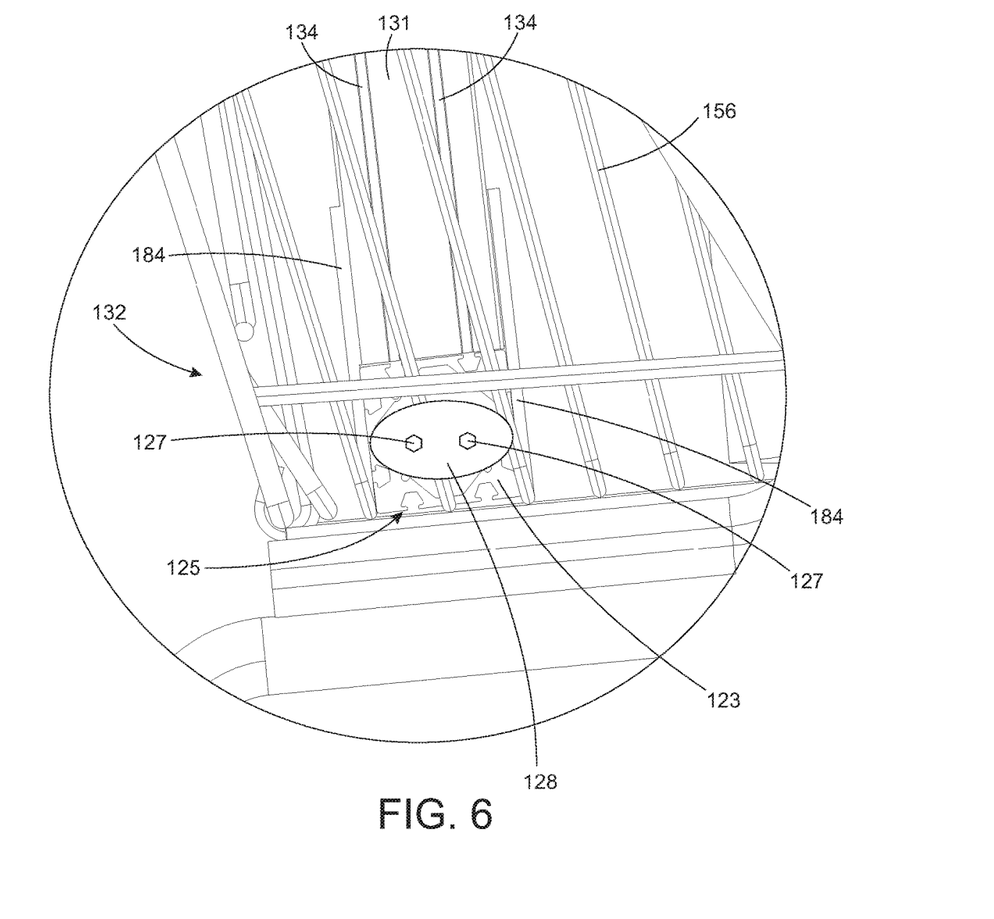
FIG. 6 shows a close-up view of a base bar coupled to a shopping cart.

Base bar 120 sets on bottom panel 152 and extends between first side panel 155 and second side panel 156, as shown in FIG. 1 and FIG. 2. Base bar 120 also includes a shopping cart coupler 124 at base bar first end 122 (FIG. 1), and a shopping cart coupler 125 at base bar second end 123 (FIG. 2). Shopping cart coupler 124 is coupled to base bar first end 122, and couples base bar first end 122 to first side panel 155 of shopping cart basket 151, as shown in FIG. 1. Shopping cart coupler 125 is coupled to base bar second end 123, and couples base bar second end 123 to second side panel 156. As shown in FIG. 2 and FIG. 6.

FIG. 6 shows a close-up view of shopping cart coupler 125 coupling base bar second end 123 to second side panel 156. Shopping cart coupler 125 includes a coupler plate 128 that is coupled to base bar second end 123 and second side panel 156 with bolts 127, as shown in FIG. 6. Bolts 127 extend through coupler plate 128, then through second side panel 156 and into base bar second end 123. Base bar first end 122 is similarly coupled to first side panel 155 using shopping cart coupler 124 (FIG. 1).

Extension bar 130 is an elongate rigid bar 131 with an extension bar first end 132 and an extension bar second end 133 opposing extension bar first end 132. Elongate rigid bar 131 is a straight extruded aluminum bar with extension bar T slots 134 in this embodiment, but this is not meant to be limiting. Elongate rigid bar 131 has a square cross section in this embodiment, with two extension bar T slots 134 on each of four sides of elongate rigid bar 131. Elongate rigid bar 131 has a longitudinal axis 135 (see FIG. 5). Extension bar T slots 134 extend longitudinally along each of the four sides of elongate rigid bar 131, but this is not meant to be limiting. Extension bar 130 has at least one extension bar T slot 134 extending longitudinally on a side of elongate rigid bar 131.

Extruded aluminum bars with T slots are used, in this embodiment, for base bar 120, extension bar 130, and scanner support bar 140 for ease of interconnecting and to minimize weight, but it is to be understood that base bar 120, extension bar 130, and scanner support bar 140 can be any type of elongate bar with many different cross-sectional shapes and made of many different types of materials.

Figure 7:
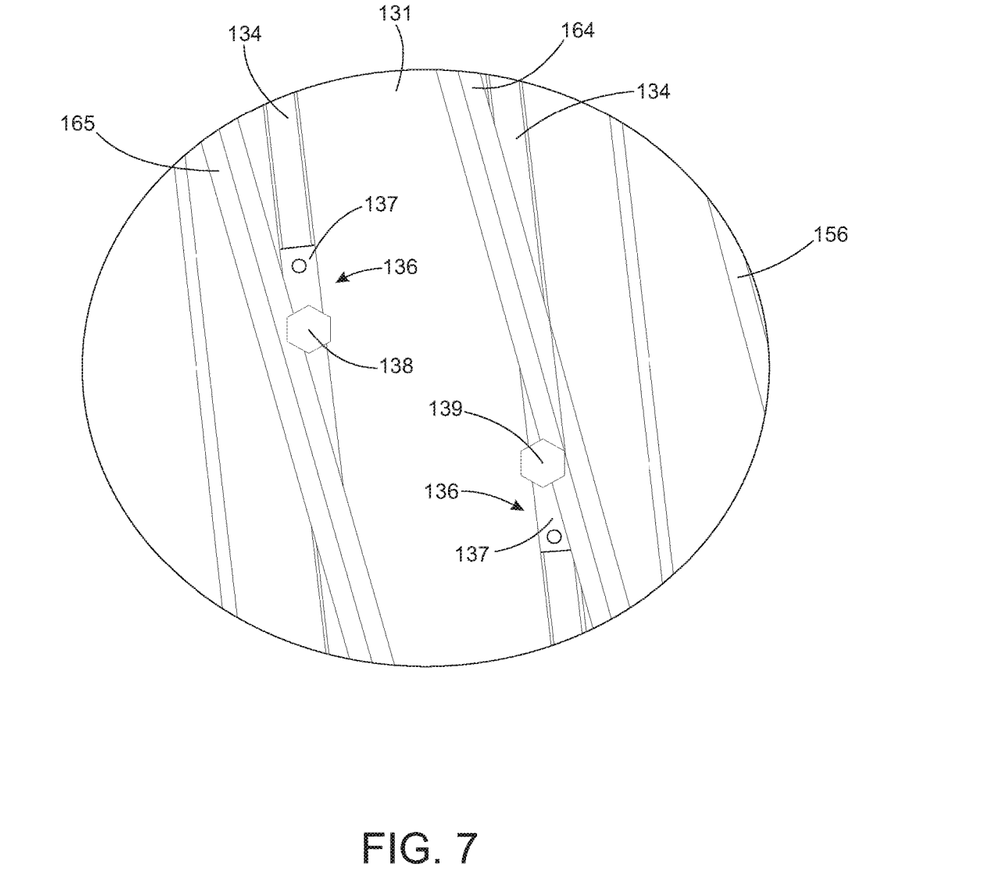
FIG. 7 shows a close-up view of an extension bar coupled to a shopping cart.

Extension bar 130 also includes at least one slide coupler 136 in an extension bar T slot 134, as seen in FIG. 7. Each slide coupler 136 includes a double T nut 137 that slides along an extension bar T slot 134, with two holes that each can each receive a bolt 138. Slide couplers 136 are used to couple extension bar 130 to shopping basket 151.

Extension bar 130 is coupled to base bar 120. In this embodiment, extension bar 130 is coupled to base bar 120 such that base bar 120 and extension bar 130 are approximately perpendicular to each other. Extension bar first end 132 is coupled to base bar second end 123 in this embodiment, using an angle plate 185 and two joining plates 184, as best seen in FIG. 3 through FIG. 5. Angle plate 185 is triangular shaped with coupling holes, and is placed in the angle between base bar 120 and extension bar 130, as seen in FIG. 3. Angle plate 185 ensures a perpendicular relationship between base bar 120 and extension bar 130, and adds structural support to the connection between base bar 120 and extension bar 130. Joining plates 184 are each flat plates with holes that couple using bolts to both base bar second end 123 and extension bar first end 132 to couple base bar 120 and extension bar 130 to each other.

FIG. 7 shows a close-up side view of extension bar 130 coupled to second side panel 156. Extension bar first end 132 in this embodiment is coupled to base bar second end 123 (see FIG. 3 through FIG. 5). Extension bar 130 is extended along second side panel 156 and out through open top 157 so that extension bar second end 133 is outside of and above shopping cart basket 151, as shown in FIG. 1 and FIG. 2. Two slide couplers 136 are used to couple extension bar 130 to second side panel 156, as shown in FIG. 7. Each slide coupler 136 is slid along an extension bar T slot 134 until each slide coupler 136 is between rods 164 and 165 of second side panel 156, as shown in FIG. 7. Bolt 139 in a first slide coupler 136 is slid against rod 164. Bolt 138 in a second slide coupler 136 is slid against rod 165. Rods 164 and 165 are held between bolts 138 and 139 and extension bar 130. And, bolts 138 and 139 put opposing pressure on rods 164 and 165 to securely couple extension bar 130 and scanner support structure 110 to shopping cart 150.

Scanner support bar 140 is an elongate rigid bar 141 with a scanner support bar first end 142 and a scanner support bar second end 143 opposing scanner support bar first end 142, as best seen in FIG. 3 and FIG. 4. Scanner support bar first end 142 is coupled to extension bar 130. Elongate rigid bar 141 is a straight extruded aluminum bar with scanner support bar T slots 144 in this embodiment, but this is not meant to be limiting. Elongate rigid bar 141 has a rectangular cross section in this embodiment, with at least one scanner support bar T slot 134 extending longitudinally on each side of scanner support bar 140.

Figure 8:
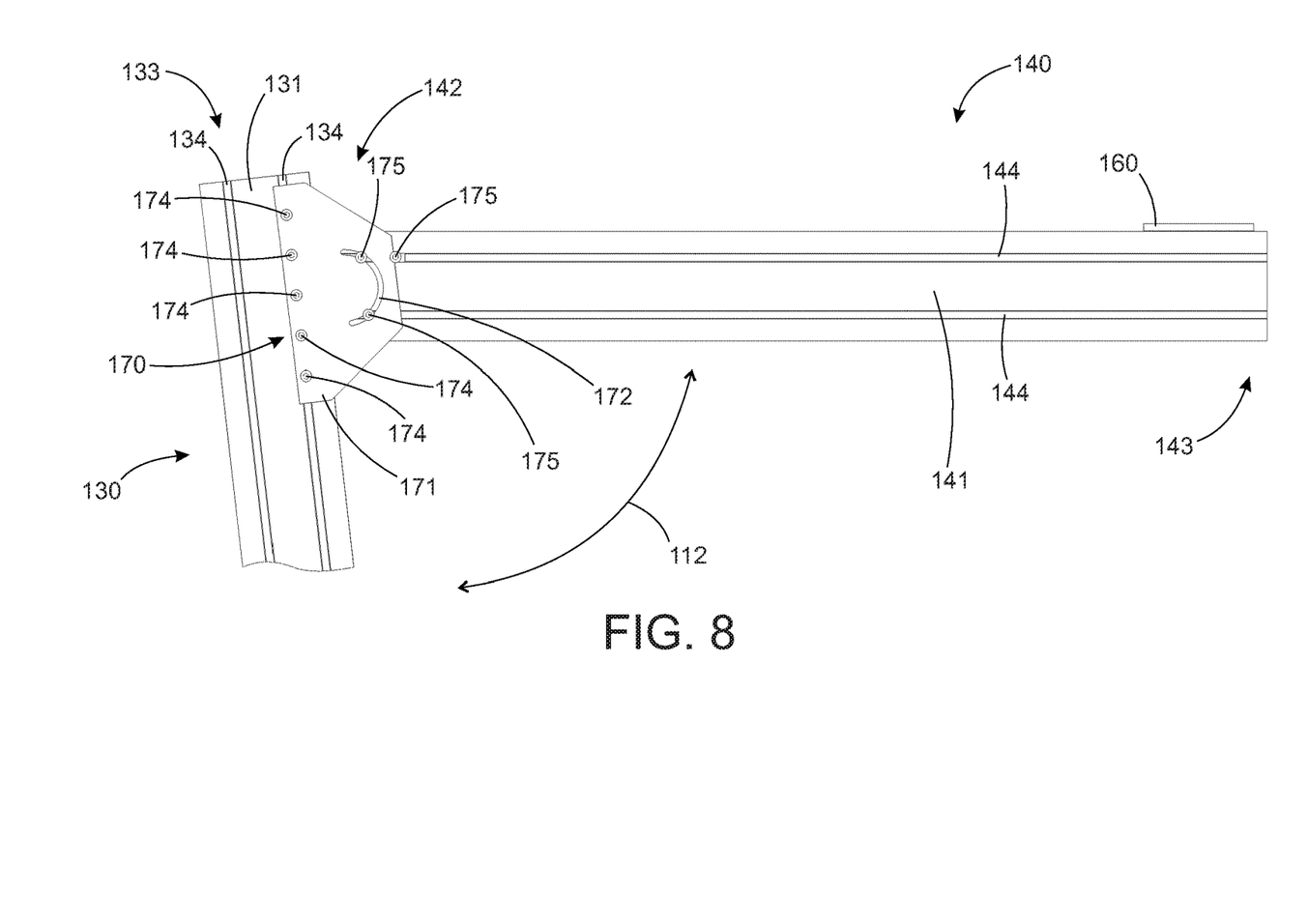
FIG. 8 shows a close-up view of a protractor joiner coupling a scanner support bar to an extension bar.

Scanner support bar 140 is coupled to extension bar 130 using a protractor joiner 170, as shown in FIG. 4 and FIG. 8. FIG. 8 shows a close-up of protractor joiner 170 coupling scanner support bar first end 142 to extension bar 130. Protractor joiner 170 allows a scanner bar angle 112 between scanner support bar 140 and extension bar 130 to be adjustable. Having scanner bar angle 112 be adjustable is advantageous because it allows leveling and positioning of scanner 114 above shopping cart 150.

Protractor joiner 170 is shown in detail in FIG. 8. Protractor joiner 170 includes a flat plate 171, and a semicircular slot hole 172 through flat plate 171. Protractor joiner 170 also includes a plurality of bolt holes that receive bolts 174 for coupling protractor joiner 170 to extension bar 130 and scanner support bar 140. Bolts 174 extend through bolt holes in protractor joiner 170 and into a slot 134 in extension bar 130, as shown in FIG. 8, to couple protractor joiner 171 to extension bar 130. Bolts 175 extend through semicircular slot hole 172 in protractor joiner 170 and into a slot 144 in scanner support bar 140. Semicircular slot hole 172 allows angular adjustment of the scanner bar angle 112 by allowing bolts 175 to slide along semicircular slot hole 172.

Shopping cart scanner support structure 110 also includes scanner arm 160. Scanner arm 160 is a flat bar of rigid material that is coupled to scanner support bar 140, as shown in FIG. 1 and FIG. 2. Scanner 114, light 116, and computer processor 118 are all coupled to scanner arm 160. Shopping cart scanner support structure 110 supports scanner arm 160 and scanner 114, light 116, and computer processor 118 above shopping cart 150 so that scanner 114 can scan items in shopping cart 150.

Scanner 114 is coupled to scanner support structure 110, see FIG. 1. Scanner 114 can be any type of electronic scanner, such as a camera or a laser scanner, for example but not by way of limitation. Scanner 114 scans items to be purchased in shopping cart 150—which means scanner 114 collects product information from the items to be purchased—and sends the product information to computer processor 118. Light 116 provides illumination of items to be purchased, to enable scanner 114 to scan items to be purchased. In some embodiments, light 116 emits a specific wavelength or range of wavelengths of illumination used for optimal operation of scanner 114. Computer processor 118 controls scanner 114 and light 116. Scanner 114 and light 116 are both mechanically coupled to scanner arm 160. Computer processor 118 in this embodiment is mechanically coupled to scanner arm 160 and electrically coupled to scanner 114 and light 116. Power is provided to scanner 114, light 116, and computer processor 118 with a power source of shopping cart with scanner system 108. In this embodiment, the power source is packaged with computer processor 118, but this is not meant to be limiting. The power source can be located anywhere on shopping cart with scanner system 108, such as on shopping cart 150 or on scanner support structure 110.

Figure 9:
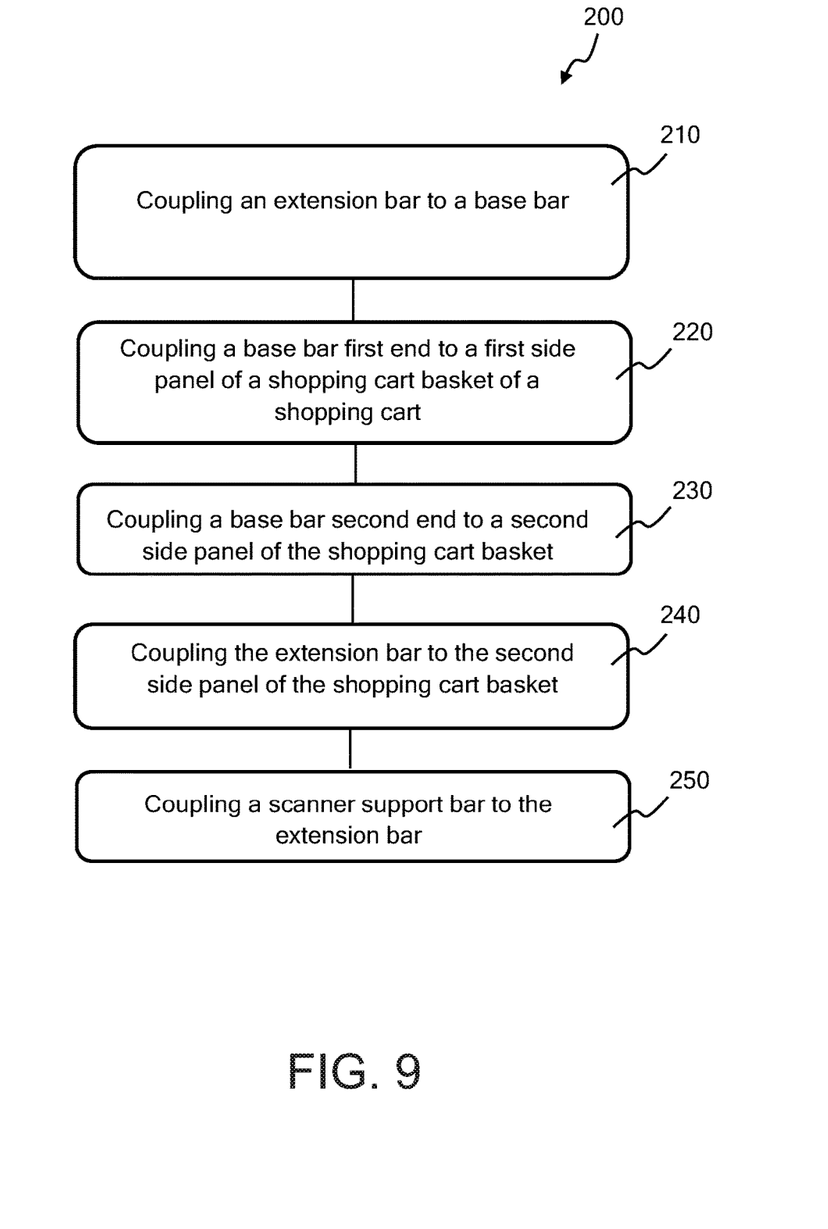
FIG. 9 illustrates a method of assembling a shopping cart with scanner system.

FIG. 9 illustrates a method 200 of assembling a shopping cart with scanner system. Method 200 includes an act 210 of coupling an extension bar to a base bar. The extension bar and the base bar are both elongate rigid bars. In some embodiments, coupling the extension bar to the base bar includes coupling an extension bar first end to a base bar second end. In some embodiments the extension bar is perpendicular to the base bar.

Method 200 also includes an act 230 of coupling a base bar first end to a first side panel of a shopping cart basket of a shopping cart, and an act 230 of coupling a base bar second end to a second side panel of the shopping cart. Coupling the base bar first end and the base bar second end to the shopping cart basket securely fastens the base bar to the shopping cart basket. In some embodiments, method 200 includes laying the base bar on a bottom panel of the shopping cart basket, where the base bar sets on the bottom panel and extends from the first side panel to the second side panel.

Method 200 also includes an act 240 of coupling the extension bar to the second side panel of the shopping cart. In some embodiments, coupling the extension bar to the second side panel of the shopping cart includes extending the extension bar along the second side panel and out through an open top of the shopping basket so that an extension bar second end is outside of and above the shopping cart basket. In this configuration, the extension bar second end is used to support additional support bars that hold a scanner, a camera, and a computer processor above the shopping cart basket. In some embodiments, coupling the extension bar to the second side panel of the shopping cart includes coupling an extension bar first side to the second side panel using an extension bar slide coupler. In some embodiments, the extension bar slide coupler is a double T nut that slides in a T slot of the extension bar. Bolts can easily be coupled to the double T nut.

Method 200 also includes an act 250 of coupling a scanner support bar to the extension bar. In some embodiments, method 200 includes coupling a scanner bar to the scanner support bar. In some embodiments, coupling the scanner support bar to the extension bar includes adjustably coupling a scanner support bar first end to the extension bar second end, wherein an angle between the scanner support bar and the extension bar is adjustable. The scanner, the light, and the computer microprocessor are all mechanically coupled to the scanner support bar. The scanner support bar holds the scanner above the shopping basket so the scanner can scan—or collect—product information from items to be purchased that a customer places in the shopping cart basket. The computer microprocessor electrically coupled to the scanner gathers the product information, totals the amount due from the customer, and, in some embodiments, completes the purchase transaction for the customer. The light is used to provide illumination on the items to be purchased for the scanner. Having an adjustable angle between the scanner support bar and the extension bar help in placing the scanner in the proper position above the shopping cart basket.

A shopping cart with scanner system has been shown and described that includes a shopping cart and a scanner system. The scanner system includes a shopping cart scanner support system and a scanner, a computer processor, and a light. The shopping cart scanner support system supports the scanner, computer processor, and light above the shopping cart so that the scanner can scan items to be purchased in the shopping cart and send the product information to the computer processor. This system provides a way for shoppers using the shopping cart with scanner system to put items they wish to purchase in the shopping cart and have the scanner scan the items and the computer processor total their bill with little effort on the part of the customer, and no employee help needed. The customer can shop as usual and items to be purchased will automatically be scanned as they are placed in the shopping cart. The computer processor can total the bill and provide a payment interface for the customer. The scanner support system couples to the shopping cart and holds the scanner, the light, and the computer processor in place above the shopping cart.

The embodiments and examples set forth herein were presented to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart scanner system comprising a shopping cart scanner support structure, wherein the shopping cart scanner support structure comprises:
 a base bar, wherein the base bar comprises:
  a first elongate rigid bar with a base bar first end and a base bar second end opposing the base bar first end; and
  a shopping cart coupler at each of the base bar first end and the base bar second end, wherein each shopping cart coupler is configured to couple to a shopping cart;
 an extension bar coupled to and extending perpendicularly from the base bar, wherein the extension bar comprises:
  a second elongate rigid bar with an extension bar first end and an extension bar second end opposing the extension bar first end, wherein the extension bar first end is coupled to the base bar second end;
  an extension bar T slot extending longitudinally in an extension bar side of the extension bar; and
  an extension bar slide coupler that slides along the extension bar T slot; and
 a scanner support bar adjustably coupled to the extension bar, wherein a scanner bar angle between the scanner support bar and the extension bar is adjustable.

2. The shopping cart scanner system of claim 1, wherein the extension bar first end is coupled to the base bar second end with a joining plate.

3. The shopping cart scanner system of claim 2, wherein the scanner support bar comprises:
 a third elongate rigid bar with a scanner support bar first end and a scanner support bar second end opposing the scanner support bar first end, wherein the scanner support bar first end is coupled to the extension bar; and
 a scanner support bar T slot extending longitudinally in a scanner support bar side of the scanner support bar.

4. The shopping cart scanner system of claim 3, wherein the scanner support bar first end is coupled to the extension bar with a protractor joiner, wherein the protractor joiner allows the scanner bar angle to be adjusted, and wherein the protractor joiner comprises:
 a flat plate;
 a semicircular slot hole through the flat plate; and
 a plurality of bolt holes through the flat plate.

5. The shopping cart scanner system of claim 4, further comprising a scanner arm coupled to the scanner support bar second end, wherein the scanner arm is configured to hold a scanner.

6. The shopping cart scanner system of claim 5, further comprising a scanner coupled to the scanner arm.

7. The shopping cart scanner system of claim 6, further comprising a light coupled to the scanner arm.

8. A shopping cart with scanner system comprising:
 a shopping cart basket comprising a bottom panel, four side panels and an open top;
 a basket support frame that supports the shopping cart basket;
 a set of wheels coupled to the basket support frame, wherein the shopping cart with scanner system rolls on the set of wheels;
 a scanner support structure coupled to the shopping basket, wherein the scanner support structure comprises:
  a base bar;
  an extension bar coupled to and extending perpendicularly from the base bar; and
  a scanner support bar adjustably coupled to the extension bar, wherein a scanner bar angle between the scanner support bar and the extension bar is adjustable; and
 a scanner arm coupled to the scanner support bar; and
 a scanner coupled to the scanner arm.

9. The shopping cart with scanner system of claim 8, further comprising a light coupled to the scanner support structure.

10. The shopping cart with scanner system of claim 9, further comprising a computer processor mechanically coupled to the scanner support structure and electrically coupled to the scanner and the light.

11. The shopping cart with scanner system of claim 10, wherein the base bar sets on the bottom panel, and wherein the base bar comprises:
   a first elongate rigid bar with a base bar first end and a base bar second end opposing the base bar first end;
   a first shopping cart coupler coupled to the base bar first end, wherein the first shopping cart coupler couples the base bar first end to a first side panel of the four side panels; and
   a second shopping cart coupler coupled to the base bar second end, wherein the second shopping cart coupler couples the base bar second end to a second side panel of the four side panels.

12. The shopping cart with scanner system of claim 11, wherein the extension bar comprises:
   a second elongate rigid bar with an extension bar first end and an extension bar second end opposing the extension bar first end, wherein the extension bar first end is coupled to the base bar second end;
   an extension bar T slot extending longitudinally in an extension bar side of the extension bar; and
   an extension bar slide coupler that slides along the extension bar T slot, wherein the extension bar slide coupler couples the extension bar to the second side panel.

13. The shopping cart with scanner system of claim 12, wherein the scanner support bar comprises:
   a third elongate rigid bar with a scanner support bar first end and a scanner support bar second end opposing the scanner support bar first end, wherein the scanner support bar first end is coupled to the extension bar; and
   a scanner support bar T slot extending longitudinally in a scanner support bar side of the scanner support bar.

14. The shopping cart with scanner system of claim 13, wherein the scanner support bar first end is coupled to the extension bar with a protractor joiner, wherein the protractor joiner allows the scanner bar angle to be adjusted, and wherein the protractor joiner comprises:
   a flat plate;
   a semicircular slot hole through the flat plate; and
   a plurality of bolt holes through the flat plate.

15. A method of assembling a shopping cart with scanner system, the method comprising:
   coupling an extension bar to a base bar;
   coupling a base bar first end to a first side panel of a shopping cart basket of a shopping cart; and
   coupling a base bar second end to a second side panel of the shopping cart basket;
   coupling the extension bar to the second side panel of the shopping cart basket; and
   coupling a scanner support bar to the extension bar.

16. The method of claim 15, further comprising laying the base bar comprising a base bar first end and a base bar second end on a bottom panel of the shopping cart basket, wherein the base bar sets on the bottom panel and extends from the first side panel to the second side panel.

17. The method of claim 16, further comprising coupling a scanner bar to the scanner support bar.

18. The method of claim 17, wherein the coupling the extension bar to the base bar comprises coupling an extension bar first end to the base bar second end.

19. The method of claim 18, wherein the coupling the extension bar to the second side panel of the shopping cart comprises:
   extending the extension bar along the second side panel and out through an open top of the shopping cart basket, wherein an extension bar second end is outside of and above the shopping cart basket; and
   coupling an extension bar first side to the second side panel using an extension bar slide coupler.

20. The method of claim 19, wherein the coupling the scanner support bar to the extension bar comprises adjustably coupling a scanner support bar first end to the extension bar second end, wherein an angle between the scanner support bar and the extension bar is adjustable.

* * * * *